United States Patent [19]

Goodey

[11] Patent Number: 4,656,336

[45] Date of Patent: Apr. 7, 1987

[54] ELECTRIC WORK-IN-CIRCUIT METAL-BONDING HEATING TOOL

[76] Inventor: Stephen D. Goodey, 7 Kaydon Dr., Decatur, Ill. 62521

[21] Appl. No.: 841,871

[22] Filed: Mar. 20, 1986

[51] Int. Cl.$^4$ .......................... H05B 3/02; B23K 3/04; B23K 9/28

[52] U.S. Cl. ............................. 219/234; 219/85 CA; 219/85 D; 219/90; 219/230

[58] Field of Search ............ 219/233, 234, 90, 85 CA, 219/85 CM, 230, 227, 236, 85 D

[56] References Cited

U.S. PATENT DOCUMENTS

| | | | |
|---|---|---|---|
| 1,617,354 | 2/1927 | Reynolds | 219/90 |
| 1,807,004 | 5/1931 | Nelson | 219/234 |
| 1,869,448 | 8/1932 | Woodring | 219/234 |
| 1,909,774 | 5/1933 | Lindsay | 219/236 X |
| 2,183,908 | 12/1939 | Gladitz | 219/85 CA |
| 2,243,086 | 5/1941 | Buettell | 219/85 CA |
| 2,844,697 | 7/1958 | Emmerson | 219/234 |
| 3,510,623 | 5/1970 | Wolgast | 219/234 X |
| 3,924,332 | 12/1975 | Rauch et al. | 219/234 X |
| 4,367,397 | 1/1983 | Henderson | 219/234 |

FOREIGN PATENT DOCUMENTS

| | | | |
|---|---|---|---|
| 1117852 | 3/1956 | France | 219/90 |
| 1527837 | 4/1968 | France | 219/234 |
| 240001 | 3/1946 | Switzerland | 219/85 CA |
| 537136 | 6/1973 | Switzerland | 219/234 |
| 609063 | 9/1948 | United Kingdom | 219/85 CA |
| 801594 | 9/1958 | United Kingdom | 219/90 |

Primary Examiner—Anthony Bartis
Attorney, Agent, or Firm—Charles J. Meyerson

[57] ABSTRACT

An electrical work-in-circuit heating tool for metal bonding especially in cramped locations where flame heating and tong-style tools are not usable. The tool comprises a hinged pair of spring-loaded arms having electrically insulating open-ended handles each of which contains a conductor bar within a grip portion thereof. The hinge comprises pivotally joined radial webs and the spring-loading is adapted to urge the distal ends of the arms toward each other. Each of the conductor bars is connected within an insulating grip portion of the handle to an electrical supply cable. At the distal end, each conductor bar carries a detachable electrode assembly that comprises a workpiece-contact member. A switch which is part of a low voltage power supply is removably mounted on the handle. Various configurations of electrode assembly are provided comprising different workpiece-contact members, such as a carbon block on each conductor bar, or a contact member on one bar and a ground clamp on the other.

3 Claims, 8 Drawing Figures

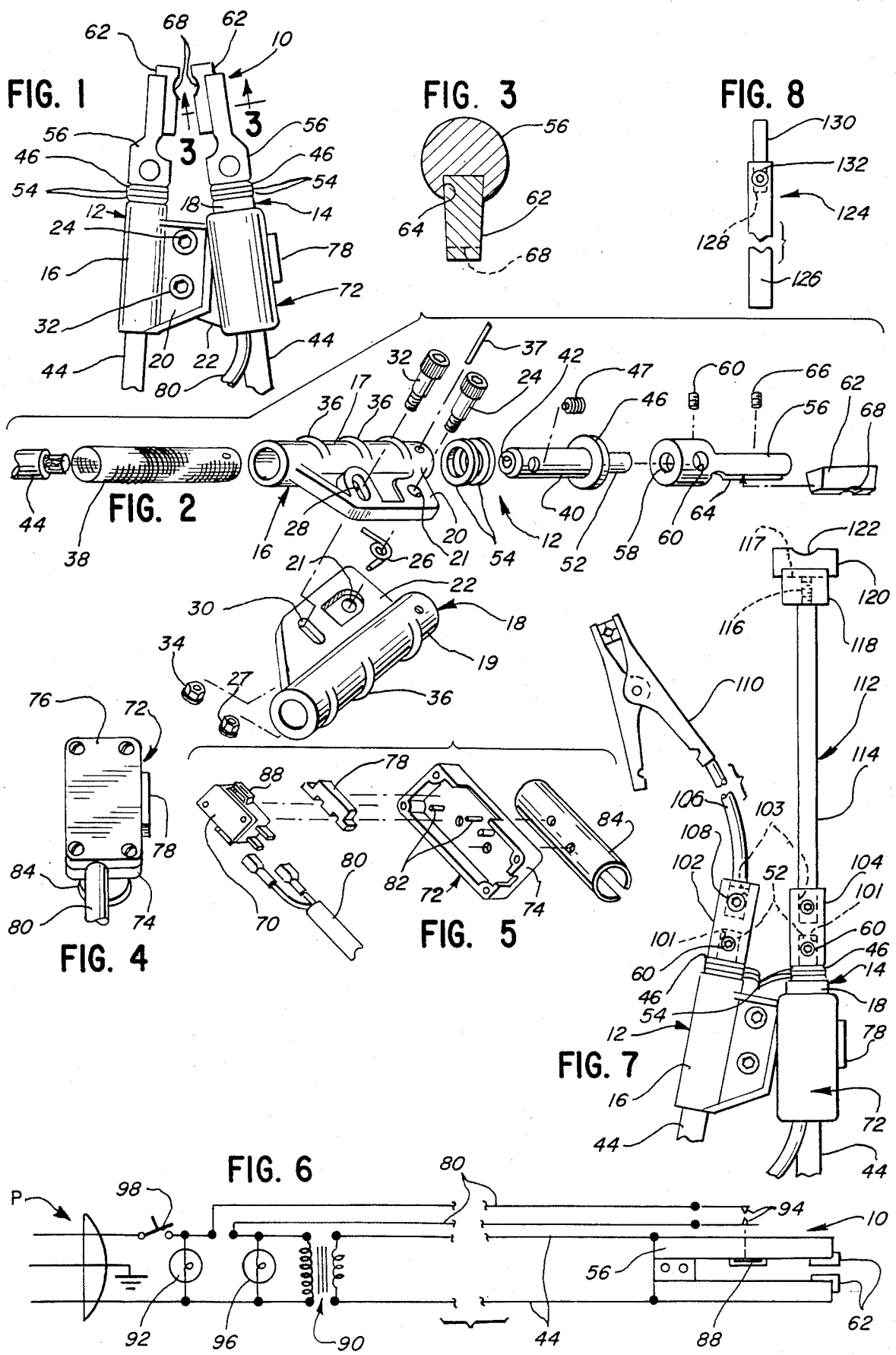

ELECTRIC WORK-IN-CIRCUIT METAL-BONDING HEATING TOOL

BACKGROUND AND OBJECTS OF THE INVENTION

This invention relates to an electric work-in-circuit heating tool for soldering and brazing. Tools of this type are disclosed in Emmerson U.S. Pat. No. 2,844,697 and, particularly, in Henderson U.S. Pat. No. 4,367,397.

The present invention is an improvement in the Henderson tool especially for use in cramped or close quarters, for example, in repairing tubing in consumer appliances such as refrigerators and air conditioners, in repairing aircraft tubing, and in like places. Current field practice, so far as is known, is to use flame heating for such repairs or to remove the parts for repair, because tools of the kind shown in the patents cited that are now in use are cumbersome and unwiedly and too large for the cramped locations. Flame heating in place is difficult to carry out, requires great care and experience and is a fire hazard; in many enclosed spaces flame heating cannot be used at all. There is, accordingly, a demand and need for a suitable tool for work-in-circuit heating for brazing and soldering.

It is the principal object of this invention to provide a tool of this kind. Other objects and advantages of the invention will be apparent from the following description.

BRIEF DESCRIPTION OF THE INVENTION

The improvement of this invention comprises a pair of hinged handles spring-biased at the hinge pivot to urge the operating tips into contact with each other, as in a spring clamp, the reverse of the tongs-like action of the Henderson tool referred to above. Each of the handles has a grip portion that is hollow axially to receive a coaxial conductor bar or post that is connected to an electrical cable at one end of the grip portion (the proximal end) and to an electrode holder at the other (distal end). The conductor bar or post is isolated from the grip by an insulating sleeve. The improvement includes a switch removably mounted by means of a clip that mates with a grip for one-handed use or separated from the handles for ease in positioning the electrode tips. A flange on the conductor bar or post at the distal end of the grip bears against one or more insulating washers held between the flange and the grip. The conductor post has a reduced-diameter portion or mounting peg outside the flange that is formed to mate with and carry removable, conductive electrode holders. Various forms of electrode holder for a variety of electrode arrangements can be fitted to the mounting peg. A preferred form is an electrode holder having a dovetail groove to receive a mating tapered electrode held in place by a set screw.

BRIEF DESCRIPTION OF THE DRAWING FIGURES

FIG. 1 is a side elevation of a preferred embodiment of the tool of the invention, illustrated with the electrode holders fitted with cooperating carbon electrodes designed to clamp on to a work piece held between them.

FIG. 2 is an exploded view of one arm of the tool of FIG. 1, with the second handle of the tool and the hinge arrangement displayed.

FIG. 3 is an enlarged elevation of one electrode and holder, in section taken on the line 3—3 of FIG. 1.

FIG. 4 is an isometric view of the switch assembly of FIG. 1.

FIG. 5 is an exploded view of the switch assembly of FIG. 1 with the cover removed to show the interior assembly.

FIG. 6 is a schematic wiring diagram of a circuit for the electrodes.

FIG. 7 is a view, similar to FIG. 1, showing an arrangement of electrode elements to permit remote placement of the ground electrode and also illustrating an alternative electrode and carrier.

FIG. 8 is an elevation of another alternative electrode and holder useful in the assembly shown in FIG. 7.

DETAILED DESCRIPTION

With reference first to FIGS. 1-5, numeral 10 generally indicates a preferred embodiment of the work-in-circuit tool of this invention comprising a first arm 12 and a second arm 14. The arms comprise handles 16 and 18, respectively, of heat-resistant, electrically non-conductive material, preferably fiber-reinforced plastic, to isolate the conductive elements electrically within the handles. Electrical supply cables 44 enter the handles at the proximal end of the arms, and electrodes are mounted at the distal end of the arms.

The handles comprise generally cylindrical grips 17 and 19, with integral webs 20 and 22, respectively, extending radially from the grips. The webs have matching aligned bores 21, 21 in which a hinge pin 24 is seated as a pivot so that the webs serve as the leaves of a leaf hinge. The hinge pin 24 is a shoulder bolt threaded into a nut 27 (FIG. 2) to hold the webs together. A torsion spring 26 is held in facing recesses in webs 20 and 22, the spring having a coil through which the hinge pin passes and two outwardly extending arms or wings arranged in the recesses to urge the distal (electrode) ends of arms 12 and 14 together and the proximal ends apart. A second threaded pin 32 held by a nut 34 (similar to hinge pin and nut 24, 27) is held in aligned arcuate slots 28 and 30 in webs 20 and 22, respectively, to hold the webs together in loosely sliding contact and limit movement.

As noted the handles 16 and 18 are of insulating construction. The cylindrical grip portions 17 and 19, respectively, are hollow and have raised integral ribs, as at 36, for gripping firmly. Nested in each hollow grip is an insulating sleeve 38 coaxial with the grip. Each sleeve is preferably formed of woven ceramic fiber and may be extended through the distal end of the grip and flared back over the end of the grip. Within the insulating sleeve, there is a conductor bar 40 which is also coaxial with the grip and fills the hollow of the grip inside the insulating sleeve. The conductor bar or post is fabricated of a suitable steel that conducts the necessary current without overheating. The assembly is held together by a drive pin 37 through handle 16, sleeve 38 and conductor bar 40 at the distal end. Handle 18 is similarly assembled.

Conductor bar 40 is axially counterbored at 42 to receive the stripped end of insulated, preferably stranded, power cable 44. Stripped end of cable 44 is held in counterbore 42 by recessed set screw 47 so that the cable makes good electrical contact with conductor bar 40. The conductor bars are positioned in grips 17 and 19 to assure that each stripped end of cable 44 in counterbore 42 is within its insulating sleeve inside the grip.

At its other end (distal end), each conductor bar 40 has an annular flange 46 spaced from the end of the grip (17 and 19, FIG. 2). Insulating washers 54 (for example, two on each conductor bar 40) are held between the flange and grip end. The flared-back end of the insulating sleeve 38 should be compressed between the washers 54 and the end of each grip.

The distal end of each conductor bar 40, beyond the flange 46, is formed with an integral mounting peg or post 52, of reduced diameter, extending outward from the grip and coaxial with the conductor bar. The mounting peg 52 receives an electrode holder 56 having an axial counterbore 58 and a radial or transverse bore 60 both of which are sized to mate with the peg 52. The counterbore 58 and radial bore 60 permit the electrode holder 56 to be mounted in axial or transverse alignment, as illustrated in the Henderson patent referred to before. The electrode holder is held in place by a recessed set screw 60.

The electrode holders 56 have, at their outer facing ends, axially aligned grooves 64 with trapezoidal section (FIG. 3). The grooves 64 are the females of dovetails and receive mating trapezoid-section electrodes 62 to position the electrodes axially. The electrodes 62, of carbon or other suitable material, are held in conductive contact with the electrode holders 56 by recessed set screws 66. The facing surfaces of electrodes 62 may have matching grooves or notches 68 to enable the electrodes to grab and hold tubing or other small parts.

Current flow to the electrodes 62 is from the cables 44 through conductor bars 40, thence through the electrode holders 56 to the electrodes 62. The current is controlled by a normally open miniature switch (FIGS. 4–5) set into a generally rectangular switch housing 72. The housing 72 comprises a cover 76 secured to a base 74 by screws, the base having a recess for the miniature switch 70 and pins 82 to position the switch. A push button 78 through an opening in the base operates the switch plunger 88. The switch is connected by a cable 80 which is part of the control-and-power-supply circuit shown in FIG. 6.

The switch case may be clipped to one of the handles by a clip member 84 (FIGS. 4 and 5) mounted on the base 74 of the switch case. The clip member 84 is a partial cylinder formed, for example, from semi-rigid tubing of suitable length and diameter. The axial slot allows it to be slipped over and to fit closely the diameter of grips 17 and 19 to permit use on the handle for one-hand operation, as in the arrangement shown in FIG. 1, or away from it.

Switch 70 is part of the control circuit illustrated in FIG. 6 and which is essentially the same as the circuit of the Henderson patent. When the button 78 is pushed inward, it presses the switch plunger 88 to close the contacts 94 (FIG. 6) of the switch. This makes the circuit to the primary step-down transformer 90. The primary is connected to a power source (generally designated "p") through an on-off power switch 98 at the power supply. Power for heating may be supplied, e.g., at seven volts and 375 amperes, built-in maximum. Signal lamp 96 is energized when the switch 70 is closed connecting the primary transformer winding with the power source. Signal lamp 92 is connected across the power supply and is energized when the power switch 98 is closed to supply current to the circuit.

In use, the circuit is connected to a suitable power supply, e.g. in domestic use to a 110–120 volt A.C. circuit. The power switch 98 is closed supplying current through cable 80 to contacts 94 of control switch 70 and activating signal light 92. The handle grips 17 and 19 are squeezed together against the spring 26 to force the electrodes 62 apart, and the electrodes are positioned on the work piece to be heated. Releasing the grips 17 and 19 permits the electrodes to clamp onto the work piece. When the contacts 94 of switch 70 are closed by manual pressure through switch button 78 and plunger 88, current is supplied to the electrodes to heat the work piece to the proper temperature for soldering or brazing. This activates signal light 96. The electrodes can remain in place on the work piece while the heating is controlled by means of switch 70. To remove the tool, the handles 12 and 14 are squeezed together to release the spring-powered clamping action of electrodes 62.

Alternative electrode structures are illustrated in FIGS. 7 and 8. In FIG. 7, the electrode holders 56 are replaced by solid cylindrical conductor post extensions or spools 102 and 104 on arms 12 and 14, respectively. The spools 102 and 104 are each counterbored at each end. At one end, the counterbores (reference numeral 101) mate with the mounting pegs 52, the distal ends of the conductor posts 40. The counterbores at the distal ends of spools 102 and 104 (reference numeral 103) are adapted to receive alternative electrode structures.

In the structure of FIG. 7, the counterbore 103 of spool 102 receives the stripped end of flexible welding cable 106 of any desired length, the cable being held in electrical contact with spool 102 by a set screw 108. The free end of the cable 106 carries a grounding clamp 110 (or other suitable clamping device) which is crimped and soldered to the cable conductor end.

Counterbore 103 of spool 104 carries an alternative electrode assembly or probe 112 comprising a conductive rod 114, e.g. of steel, threaded at its outer end 116 and an electrode holder 118 drilled and threaded to receive the threaded end 116. The outer (distal) surface of electrode holder 118 further has a dovetail slot 117 transverse to the axis of probe 112. Slot 117 holds a mating trapezoidal-section carbon electrode 120, generally similar to that of FIG. 3, having a notch 122 in its outer surface to fit against tubing or other narrow surface. The threaded end 116 of rod 114 extends through the electrode holder to bear against the electrode and hold it in the dovetail groove.

FIG. 8 illustrates still another electrode assembly or probe 124 that can be used in place of the electrode assembly 112. The assembly 124 comprises a conductive rod 126, e.g. of steel, which is axially counterbored at 128 to receive a cylindrical (pencil) carbon electrode 130 held in the counterbore by a radial set screw 132. The rods 114 and 126 may be of any suitable length and may be curved or formed as desired to reach otherwise inaccessible locations.

This invention makes resistance heating available for locations and uses that were previously inaccessible or were dangerous for flame heating. It is flexible in utility and can be fitted with electrical disconnects to facilitate changing to the standard tong-style handles of the Henderson patent when desired.

The invention has been described herein with reference to specific illustrations and details.

Without being bound by the specific details shown, what is claimed is:

1. A low-voltage, high-ampeage, work-in-circuit metal bonding tool comprising a pair of elongated handles of rigid electrically insulating material, each of said handles having a hollow hand-grip portion open at each end and an external radially extending web, said webs being pivotally joined to each other to form a hinge between a proximal end and a distal end of the handles for permitting the distal ends to move toward and away from each other, a power supply cable entering the proximal end of each said hand-grip portion, a rigid solid conductor bar within each said handgrip portion and electrically joined therein to said cable, said conductor bar extending out from said hand-grip portion at the distal end thereof, an annular external flange on said conductor bars in spaced relationship to the distal ends of said hand-grip portions, an axial electrically insulating sleeve within each said grip portion between said conductor bar and said hand-grip portion, annular thermal insulating means between each said flange and the distal end of each said hand-grip portion, a mounting peg on the distal end of each of said bars and an electrode assembly detachably mounted on each said mounting peg and including a member adapted to make electrical contact with a metal workpiece to be heated, and a spring in cooperating relation to said hinge to urge the distal ends of said handles toward each other.

2. The tool of claim 1 in which each electrode assembly comprises an electrode holder detachably mounted on each said mounting peg, each holder carrying a transversely tapered carbon electrode block forming said workpiece-contact member, said electrode block being adapted to be slidably held in a dovetail groove in said holder in face-to-face relation to the electrode block in the other holder, whereby a workpiece is held between the face-to-face electrode blocks by said spring urging the distal ends of the handles together.

3. The tool of claim 1 in which each electrode assembly includes a spool having its inner end adapted to mate with the mounting peg of one conductor bar and a workpiece-contact member extending from its other end, the workpiece-contact member of one spool comprising a ground clamp and the workpiece-contact member of the other spool comprising a heating electrode.

* * * * *